United States Patent [19]

Hungerford

[11] Patent Number: 4,609,081
[45] Date of Patent: Sep. 2, 1986

[54] HYDRAULIC SNUBBER

[75] Inventor: Emory D. Hungerford, Milwaukie, Oreg.

[73] Assignee: Esco Corporation, Portland, Oreg.

[21] Appl. No.: 630,516

[22] Filed: Jul. 12, 1984

[51] Int. Cl.[4] .................................................. F16F 9/14
[52] U.S. Cl. ........................... 188/307; 188/322.13; 294/88; 403/34; 403/117; 414/719; 901/28
[58] Field of Search ............... 188/307, 306, 321.11, 188/322.11, 322.13, 322.15, 322.18, 322.22, 322.5, 83; 192/58 A; 414/569, 719, 706; 294/88, 106, 111; 403/117, 113, 31, 34; 901/28, 29

[56] References Cited

U.S. PATENT DOCUMENTS

| | | | |
|---|---|---|---|
| 1,556,790 | 10/1925 | Helfinstine | 188/307 |
| 1,843,682 | 2/1932 | Kinnear | 188/307 |
| 1,852,755 | 4/1932 | Peo | 188/307 X |
| 2,314,493 | 3/1943 | Guy | 188/306 |
| 2,790,520 | 4/1957 | Kuhn | 188/307 |
| 3,419,114 | 12/1968 | Rumsey | 188/306 X |
| 3,497,241 | 2/1970 | Jones | 188/306 X |
| 3,592,503 | 7/1971 | Lundberg | 294/88 X |
| 4,181,343 | 1/1980 | Lindquist | 294/88 X |

FOREIGN PATENT DOCUMENTS

| | | | |
|---|---|---|---|
| 110583 | 5/1900 | Fed. Rep. of Germany | 188/306 |
| 472836 | 9/1937 | United Kingdom | 188/307 |

Primary Examiner—Bruce H. Stoner, Jr.
Assistant Examiner—Michael P. Gilday
Attorney, Agent, or Firm—Tilton, Fallon, Lungmus & Chestnut

[57] ABSTRACT

A hydraulic snubber suitable for a skidding grapple or the like in which a twisted figure eight housing is provided to oppose free swinging in two mutually perpendicular horizontal directions, each portion of the figure eight body having a cylinder housing a rotor with each rotor and cylinder having radially extending vanes equipped with flexible, orifice equipped vane extensions.

1 Claim, 4 Drawing Figures

HYDRAULIC SNUBBER

BACKGROUND AND SUMMARY OF INVENTION:

This invention relates to a hydraulic snubber and more particularly, to a hydraulic snubber especially advantageous in connecting the head assembly of a grapple to the boom mount such as are found on the rear frame of crawler or rubber-tired tractor skidders.

A grapple with which the invention can be used advantageously is seen in my earlier U.S. Pat. No. 4,358,147 and a skidding grapple is seen in co-owned U.S. Pat. No. 4,400,132.

Uneven ground and rapid changes in speed and direction of the skidder cause the empty grapple head assembly to swing violently when unrestrained. This swinging motion causes the grapple head to bang into the boom and rear frame of the skidder, resulting in damage to the boom, grapple and tractor.

The purpose of the snubber, which is the connecting link between the grapple head and boom, is to dampen the violent damage-causing motion out. At the same time, the snubber link, being a universal type joint, must allow controlled movement of up to 90 degrees each side of plumb in the lateral and longitudinal direction relative to the tractor.

Current means of dampening this motion are subject to high maintenance and frequent adjustments in order to perform well with consistency and are rendered useless when contaminated with oil or grease. The inventive snubber described here requires no adjustment and infrequent maintenance. It is a sealed unit, has only two moving parts, and works on the known principle of force induced fluid displacement (see U.S. Pat. No. 3,592,503). Grease or other high viscosity synthetic lubricant is contained in two cylindrical chambers, divided into two inversely variable compartments.

Two diametrically opposed vanes cause the chamber division. One vane is integral with a rotatable housing, and the other with a rotor which is in turn keyed to a fixed pin (or the opposite may be the case). Chamber compartment volumes vary inversely as one vane is rotated relative to the other. This variation in volume causes the dampening medium to be forced from one compartment to the other across the vanes. The passage or area through which the dampening medium must cross is such that it restricts free flow and creates a pressure drop across the vanes so that free rotation is restricted. This effect is true with rotation in either direction.

According to the invention, a novel construction of snubber is provided which makes possible universal joint action and further a vane extension configuration is provided that adjustably responds to pressure changes so as to achieve a desired snubbing or shock absorbing action.

Other objects and advantages of the invention may be seen in the details of the ensuing specification.

The invention is described in conjunction with the accompanying drawing, in which—

DETAILED DESCRIPTION

Figure 1:
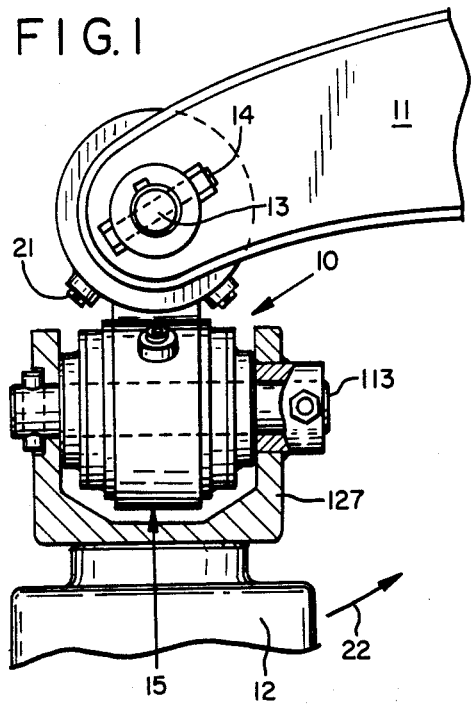
FIG. 1 is a fragmentary side elevational view, partly in section, the inventive snubber as installed on a skidding grapple.

In the illustration given and with reference first to FIG. 1, the numeral 10 designates generally the inventive hydraulic snubber. It is seen interconnected between a boom 11 at the upper end and a head assembly 12 of a grapple at the lower end. It will be appreciated that analagous applications where swinging mass energy absorption is required can utilize the invention advantageously.

Still referring to FIG. 1, it will be seen that there is a pin 13 which is non-rotatably fixed to the boom 11 by means of a nut and bolt arrangement 14. This provides one horizontal axis of rotation for the grapple (not shown).

Figure 2:
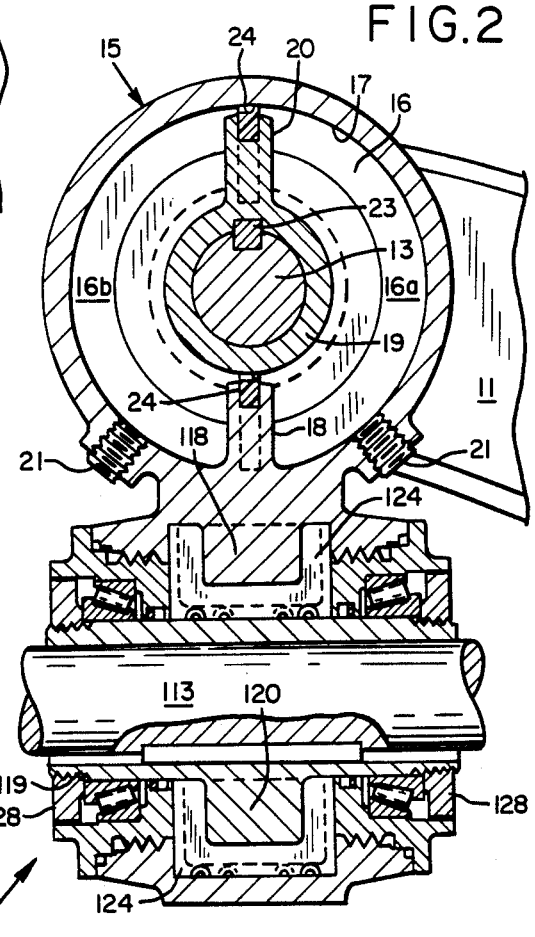
FIG. 2 is an enlarged fragmentary sectional view of the device seen in FIG. 1.

To achieve two degrees of rotation, I provide a cast body generally designated 15 (see FIG. 2). This provides a cylinder 16 having an interior wall 17. The wall 17 at one point has a radially extending vane 18 integral therewith while the pin 13 carries a rotor 19 within the chamber 16. The rotor 19 is in turn equipped with an integral, radially extending vane 20. The interior of the cylinder is filled with fluid through the fill ports 21.

OPERATION GENERALLY

Figure 4:
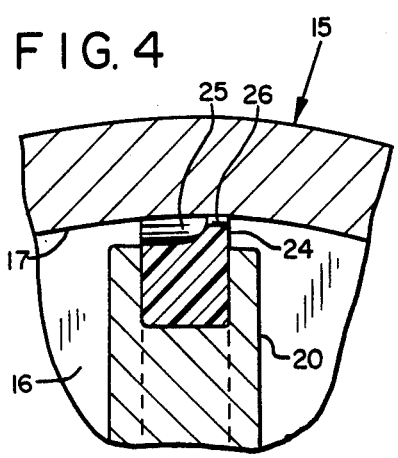
FIG. 4 is an enlarged fragmentary sectional view of the end of a vane equipped with the extension of FIG. 3 such as would be seen along the sight line 4—4 of FIG. 3 when the extension is installed on a vane.

As the grapple attempts to swing in toward the boom, i.e., in the direction of the arrow 22 applied to the lower right hand portion of FIG. 1, the body 15 starts to pivot around the pin 13. Inasmuch as the rotor 19 and integral vane 20 are fixed to the pin 13—see the key 23, the counterclockwise movement of the housing 15 decreases the volume of the vane 18 also moving in the counterclockwise direction. This means that fluid has to flow past the vanes 18 and 20 from the right hand annulus portion 16a to the left hand portion 16b. This is modulated not only by the vanes 18 and 20, but more particularly, by the vane extensions 24—see particularly FIGS. 3 and 4.

VANE EXTENSION

The vane extension 24 is seen to be U-shaped and rubs snugly against the interior faces of the body to form a tight seal. Advantageously, these vanes are constructed of elastomeric material such as urethane and are shaped so as to react to pressure demands produced by load swing. For low pressues, the medium can flow through either of the aligned orifices 25, 26—see the upper portion of FIG. 3. However, as the pressure demand builds in intensity and/or the time period shortens, the vane extensions are compressed away from the housing wall allowing more dampening fluid to pass. Then as the demand pressure drops off, the extensions move back to their original position. This means that lower viscosity, hence, less temperature sensitive dampening medium can be used.

Figure 3:
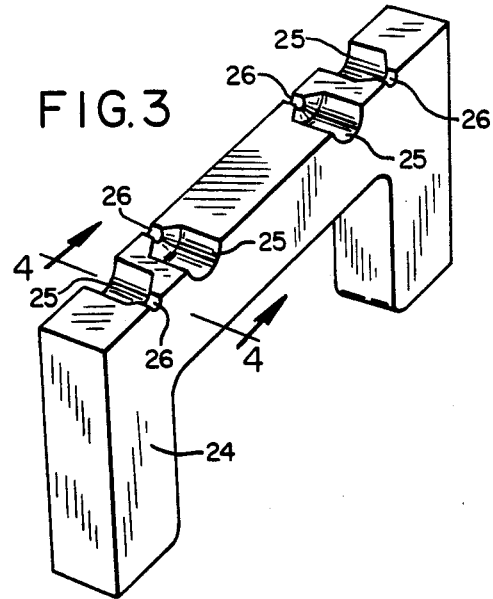
FIG. 3 is a perspective view of the vane extension employed in conjunction with the preceding views.

The vane tip orifice configuration shown in FIG. 3 is designed with pressure accumulating means in the form of the pocket type orifice 25 on each side of the individual vanes with the small groove orifice 26 leading off from the pocket means to the opposite side of the individual vane element.

The other degree of movement is provided by the structure at the bottom portion of the snubber 10. The degree of movement or rotation just described can be considered in the plane of the drawing while the one to be described in conjunction with the lower portion of the snubber can be considered to be in and out of the plane of the drawing. It will be appreciated that interiorly of the twisted FIG. 8 constituting the body 15, the upper and lower parts are identical. Therefore, the lower portions are given the same numeral designation as above—but with the addition of 100.

For example, the rotor supporting pin is designated 113—see the lower portion of FIG. 2. This has keyed to it the rotor 119 carrying the vane 120. The body 15—in its lower extent is equipped with the integral vane 118 and both the vanes 118 and 120 are equipped with extensions 124. The operation in the lower portion is exactly the same as that described above with respect to the transfer of hydraulic fluid from one annulus portion to the other upon rotation of one vane equipped element relative to the other.

Referring now to FIG. 1, it will be seen that the pin 113 is fixed to a clevis 127. The clevis 127 in turn carries the grapple head 12. So, when the grapple attempts to swing in a direction perpendicular to the plane of the drawing, the pin 113 and hence the rotor 119 pivot within the lower cylinder. The ends of each of the upper and lower cylinders are closed by means of hubs 128—see the lower right hand portion of FIG. 2—threaded into the body or housing 15.

The pressure sensitive vane extensions 24, 124 have overcome a problem existing with respect to the hydraulic dampening fluid. With the fixed orifice snubbers of the past, it was necessary to go to a less viscous fluid so as to achieve inter-annulus portion transfer under a variety of conditions. If too heavy a fluid were used, i.e., highly viscous, this would impede the operation at low temperatures. It is to be appreciated that grapples are used out-of-doors—in logging operations for example—where there can be wide temperature swings, even in the course of a day when performing logging in mountainous areas. By the same token, if the temperature rises excessively, the viscosity changes and the requisite opposition to swinging does not occur.

These problems have been avoided by the invention in which the orifice area can be more closely controlled, allowing the use of dampening fluids in which viscosity is less subject to temperature changes. The vane extension of the invention is pressure sensitive and effectively seals the clearance around the periphery of the vane except for the orifices at its tip. These orifices are constructed so that as the pressure reaches a critical point in the pocket means 25, the pressure will compress the flexible vane tip material, opening the orifice area and allowing more fluid to bypass. As pressure and vane material compressibility balance, orifice area is maintained and rotation resisting force stays the same. As pressure drops off, the flexible vane extension returns to its original shape. This results in flow past the extension equally in both directions from one side of each vane to the other. The vane extension thus becomes a pressure controlled (compensated) orifice and flow control device.

While in the foregoing specification a detailed description of an embodiment of the invention has been set down for the purpose of explanation, many variations in the details hereingiven may be made by those skilled in the art without departing from the spirit and scope of the invention.

I claim:

1. In a hydraulic snubber, a cylinder having a rotor axially disposed therein, said rotor being adapted to rotate relative to said cylinder, a first radially extending vane in said cylinder and a second radially extending vane on said rotor, means coupling the said rotor and cylinder between elements as to which the relative rotation is to be damped, each vane being equipped with a resilient extension for adjustably limiting the flow of fluid therepast and equally in both directions of rotation from one side of said vane to the other, each extension being equipped with at least two orifices communicting one side of its associated vane with the other, each orifice being equipped with a pocket, with the pockets in a given extension being located adjacent opposite sides of their associated extension.

* * * * *